United States Patent [19]

Pedemonte et al.

[11] Patent Number: 6,136,045
[45] Date of Patent: Oct. 24, 2000

[54] DYE MIXTURE COMPRISING WATER-SOLUBLE FIBER-REACTIVE AZO DYES, PREPARATION THEREOF AND USE THEREOF

[75] Inventors: Ronald P. Pedemonte, Eppstein-Vockenhausen; Werner Russ, Flörsheim-Wicker; Joachim Steckelberg, Hofheim; Christian Schumacher, Kelkheim, all of Germany

[73] Assignee: DyStar Textilfarben GmbH & Co. Deutschland KG, Germany

[21] Appl. No.: 09/372,123

[22] Filed: Aug. 11, 1999

[30] Foreign Application Priority Data

Aug. 13, 1998 [DE] Germany .................. 198 36 661

[51] Int. Cl.$^7$ ............. C09B 67/24; D06P 1/382; D06P 1/384

[52] U.S. Cl. ........................ 8/549; 8/641; 8/918

[58] Field of Search ............... 8/641, 549, 918

[56] References Cited

U.S. PATENT DOCUMENTS

| | | |
|---|---|---|
| 4,647,285 | 3/1987 | Scheibli et al. . |
| 5,250,670 | 10/1993 | Schlafer et al. . |
| 5,556,435 | 9/1996 | Russ et al. . |
| 5,925,745 | 7/1999 | Phillllps et al. . |
| 5,980,590 | 11/1999 | Russ et al. . |

FOREIGN PATENT DOCUMENTS

| | | |
|---|---|---|
| 1221360 | 5/1987 | Canada . |
| 0 094 055 | 11/1983 | European Pat. Off. . |
| 0 177 449 | 4/1986 | European Pat. Off. . |
| 0 534 342 | 3/1993 | European Pat. Off. . |
| 0 576 026 | 12/1993 | European Pat. Off. . |
| 0 719 841 | 7/1996 | European Pat. Off. . |
| 04033966 | 2/1992 | Japan . |

*Primary Examiner*—Margaret Einsmann
*Attorney, Agent, or Firm*—Connolly Bove Lodge & Hutz LLP

[57] ABSTRACT

The present invention relates to dye mixtures comprising one or more azo dyes of the general formula (1) and one or more azo dyes of the general formula (2)

where
p is 1 or 2,
$R_1$, $R^{1'}$ and $R^2$ are independently hydrogen or a group of the general formula $SO_3M$ or $OCH_3$,
$R^5$ and $R^6$ are independently hydrogen or $C_1$–$C_4$ alkyl,
$X^1$ and $X^2$ are independently fluorine or chlorine or a grouping of the general formula $NR^3R^4$ or $OR^3$,
$R^3$ is hydrogen, $C_1$–$C_4$ alkyl or optionally substituted aryl,
$R^4$ has one of the meanings of $R^3$ or is aryl or alkyl (which may be substituted by $SO_2Y$, $SO_3M$ or $OCH_3$), optionally substituted morpholino or pyrimidino or NHCN,
Y, $Y^1$ and $Y^2$ are independently vinyl or a grouping of the general formula $CH_2CH_2Z$,
Z is a grouping which can be eliminated by the action of alkali, and
M is a hydrogen atom, an ammonium ion or the equivalent of an alkali or alkaline earth metal,
their preparation and their use for dyeing or printing hydroxyl- and/or carboxamido-containing material.

12 Claims, No Drawings

DYE MIXTURE COMPRISING WATER-SOLUBLE FIBER-REACTIVE AZO DYES, PREPARATION THEREOF AND USE THEREOF

DESCRIPTION

Dye mixture comprising water-soluble fiber-reactive azo dyes, preparation thereof and use thereof This invention relates to the technical field of fiber-reactive azo dyes.

EP-A 534 342 (U.S. Pat. No. 5,250,670) and EP-A 177 449 (U.S. Pat. No. 4,647,285) disclose dyes of the hereinbelow defined general formulae 1 and 2. However, these dyes have certain application defects, for example an excessive dependence of the color yield on changing dyeing parameters in the dyeing process, an insufficient solubility in the aqueous dyebath at higher dye concentrations in the presence of electrolyte salts or an insufficient color build-up on cotton (good color build-up follows from the ability of a dye to produce a correspondingly stronger dyeing from an increased dye concentration in the dyebath). Possible consequences of these shortcomings are poor reproducibilities for the dyeings which are obtained.

However, it is particularly important to obtain dyeings having a good color yield, i.e., dyeings whose depth of shade is very high in relation to the amount of dye used, for example in comparison with other dyes, because of the coloring property of the dye itself (high absorbance) and because of the dyeing characteristics of this dye, such as good affinity and a high yield of fixation. If mixtures of dyes having a certain color yield are used, the color yield of this mixture of dyes will generally be the average of the color yields of the individual dyes. The color yield of a mixture of, for example, two dyes will therefore be lower than the color yield obtained when the dye having the larger color yield property is used as the only dye, but in the total amount of the two individual dyes.

The present invention, then, provides dye mixtures which provide dyeings having a color yield which is surprisingly higher than the average of the color yields of the dyeings of the individual dyes in the dye mixture. This synergistic effect also shows itself in improved build-up characteristics on the part of the mixtures of the invention, especially on cotton, compared with the individual dyes in the mixture.

The invention accordingly provides dye mixtures comprising one or more azo dyes of the general formula (1) and one or more azo dyes of the general formula (2)

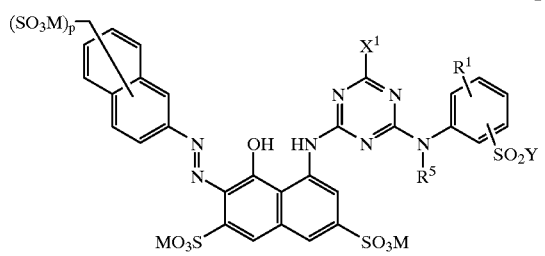

1

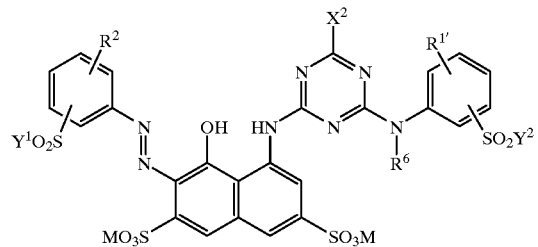

2 where
p is 1 or 2,
$R^1$, $R^{1'}$ $R^2$ are independently hydrogen or a group of the general formula $SO_3M$ or $OCH_3$,
$R^5$ and $R^6$ are independently hydrogen or $C_1$–$C_4$ alkyl,
$X^1$ and $X^2$ are independently fluorine or chlorine or a grouping of the general formula $NR^3R^4$ or $OR^3$,
$R^3$ is hydrogen, $C_1$–$C_4$ alkyl or optionally substituted aryl,
$R^4$ has one of the meanings of $R^3$ or is aryl or alkyl (which may be substituted by $SO_2Y$, $SO_3M$ or $OCH_3$), optionally substituted morpholino or pyrimidino or NHCN,
Y, $Y^1$ and $Y^2$ are independently vinyl or a grouping of the general formula $CH_2CH_2Z$,
Z is a grouping which can be eliminated by the action of alkali, and
M is a hydrogen atom, an ammonium ion or the equivalent of an alkali or alkaline earth metal.

In general, the azo dye of the general formula (1) and the azo dye of the general formula (2) are present in the mixtures of the invention in a mixing ratio of 90:10% by weight to 10:90% by weight, preferably in a ratio of 70:30% by weight to 30:70% by weight. They are particularly preferably present in the mixtures of the invention in a ratio of 55:45 to 45:55% by weight.

$C_1$–$C_4$ Alkyl $R_3$, $R_4$, $R_5$ or $R_6$ may be straight-chain or branched and be methyl, ethyl, propyl or butyl, with ethyl and especially methyl being preferred.

Aryl $R_3$ is especially phenyl or naphthyl, which may each be optionally substituted by $SO_3M$.

Aryl $R_4$ is preferably phenyl or naphthyl. Alkyl $R_4$ preferably has 1 or 2 carbon atoms and is particularly preferably ethyl.

Morpholino or pyridino $R_4$ may be substituted by carboxyl, for example. A grouping Z which can be eliminated by the action of alkali is in particular sulfato of the formula —$OSO_3M$, thiosulfato of the formula —$SSO_3M$ or acetyloxy of the formula —$OCOCH_3$, in each of which M is as defined above.

The groups —$SO_2Y$, —$SO_2Y^1$ and —$SO_2Y^2$ are preferably disposed meta or para to the azo or amino group, respectively.

Preferred dye mixtures of the invention comprise azo dyes of the general formulae (1) and (2) where
p is 2, and the two —$SO_3M$ groups are in positions 1 and 5,
$R^1$, $R^{1'}$, $R^2$, $R^5$ and $R^6$ are each hydrogen,
$X^1$ and $X^2$ are each chlorine or fluorine,
Y, $Y^1$ and $Y^2$ are each —$C_2H_4OSO_3M$, and
M is hydrogen, lithium or sodium.

The dye mixtures of the invention can be present as a preparation in solid or in liquid (dissolved) form. In solid form, they generally include the electrolyte salts customary for water-soluble and especially for fiber-reactive dyes, such as sodium chloride, potassium chloride and sodium sulfate, and may further comprise the auxiliaries customary in commercial dyes, such as buffer substances capable of setting a pH in aqueous solution between 3 and 7, such as sodium acetate, sodium borate, sodium bicarbonate, sodium dihydrogenphosphate, sodium tricitrate and disodium hydrogenphosphate, small amounts of siccatives or, if they are present in a liquid, aqueous solution (including the presence of thickeners of the type customary in print pastes), substances which ensure a long life for these preparations, for example mold preventatives.

The dye mixtures of the invention are generally present as pulverulent preparations which include an electrolyte salt or standardizing agent fraction of from 10 to 80% by weight, based on the preparation. The aforementioned buffer substances are generally present in a total amount of up to 5% by weight, based on the preparation. If the dye mixtures of the invention are present in aqueous solution, the total dye content of these aqueous solutions will be up to about 50% by weight, for example between 5 and 50% by weight, and the electrolyte salt content of these aqueous solutions will preferably be below 10% by weight, based on the aqueous solution. The aqueous solutions (liquid preparations) may include the aforementioned buffer substances in an amount which is generally up to 10% by weight, preferably up to 2% by weight.

The dye mixtures of the invention are preparable in a conventional manner, as by mechanically mixing requisite amounts of the individual dyes known from the abovementioned EP-As in solid or liquid form, or by synthesis by means of customary diazotization and coupling reactions and conversion reactions with the halotriazine component using appropriate mixtures of such components in a manner which will be familiar to one skilled in the art and using the amounts required for this purpose.

One possible procedure, for example, comprises reacting a compound of the general formula (3A)

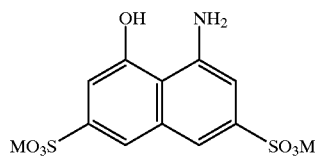

(3A)

where M is as defined above, with a trihalotriazine, especially trichlorotriazine or trifluorotriazine, in a conventional manner, as for example at a temperature between −10 and 60° C., preferably between 0 and 40° C., and at a pH between 0 and 8, preferably between 3 and 5, and subsequently reacting the resulting product with a mixture of one or more amino compounds of the general formula (3B) and one or more amino compounds of the general formula (3C)

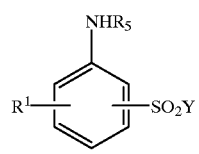

(3B)

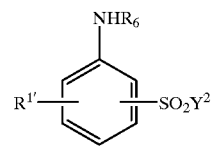

(3C)

where $R^1$, $R^{1'}$, $R^5$, $R^6$, Y and $Y^2$ are each as defined above, in a conventional manner, as for example at a temperature between 0 and 60° C., preferably between 0 and 40° C., and a pH between 2 and 8, preferably between 3 and 5, and then reacting the resulting diaminohalotriazine compounds with a diazonium salt mixture prepared in a well known manner from an amine of the general formula (3D)

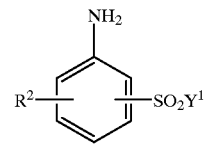

(3D)

and a naphthylamine of the general formula (3E)

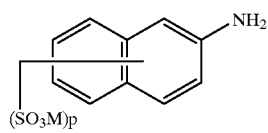

(3E)

where $R^2$, $Y^1$, M and p are each as defined above, in a conventional manner, for example at a temperature between 10 and 50° C., preferably between 20 and 35° C., and at a pH between 3 and 7, preferably between 4 and 5, to form the inventive mixture of the azo dyes 1 and 2. Dyes of the formulae 1 and 2 where $X^1$ and $X^2$ are not halogen are obtained by reacting the mixture with the compounds $HOR^3$ or $HNR^3R^4$, where $R^3$ and $R^4$ are each as defined above, in a conventional manner, for example at a temperature between 10 and 100° C., preferably between 40 and 80° C., and at a pH between 3 and 7, preferably between 4 and 5.

Examples of starting compounds of the general formula (3A) are the sodium salt and the potassium salt of 8-hydroxy-3,5-disulfo-1-naphthylamine or preferably 8-hydroxy-3,5-disulfo-1-naphthylamine itself.

Examples of starting compounds of the general formula (3B), (3C) and (3D) are 4-(β-sulfatoethylsulfonyl)aniline, 3-(β-sulfatoethylsulfonyl)aniline, 4-(β-sulfatoethylsulfonyl)-2-aminoanisole, 3-(β-sulfatoethylsulfonyl)-5-aminoanisole, 2-sulfo-4-(β-sulfatoethylsulfonyl)aniline, 2-sulfo-5-(β-sulfatoethylsulfonyl)aniline, and also derivatives of these compounds in which the β-sulfatoethylsulfonyl group is replaced by vinylsulfonyl, β--thiosulfatoethylsulfonyl or β-chloroethylsulfonyl. A preferred starting compound is 4-(β-sulfatoethylsulfonyl)aniline.

Examples of starting compounds of the general formula (3E) are 1-sulfo-2-naphthylamine, 1,5-disulfo-2-naphthylamine, 1,4-disulfo-2-naphthylamine and 6,8-disulfo-2-naphthylamine.

The separation from their synthesis solution of the chemically produced dye mixtures of the invention can be effected by commonly known methods, for example either by precipitating from the reaction medium by means of electrolytes, for example sodium chloride or potassium chloride, or by evaporating or spray-drying the reaction solution, in which case this reaction solution may have a buffer substance added to it.

The dye mixtures of the invention have useful application properties. They are used for the dyeing or printing of hydroxyl- and/or carboxamido-containing materials, for example in the form of sheetlike structures, such as paper and leather or of films, for example composed of polyamide, or in bulk, as for example of polyamide and polyurethane, but especially for dyeing or printing these materials in fiber form. Similarly, the as-synthesized solutions of the dye mixtures of the invention, if desired after addition of a buffer substance, and also if desired after concentrating or diluting, can be used directly as liquid preparation for dyeing.

The present invention thus also provides for the use of the dye mixtures of the invention for dyeing or printing these materials, or rather to processes for dyeing or printing these materials in a conventional manner, by using a dye mixture of the invention as colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dye mixtures of the invention can be applied to and fixed on the substrates mentioned, especially the fiber materials mentioned, by the application techniques known for water-soluble dyes, especially fiber-reactive dyes.

For instance, on cellulose fibers they produce from a long liquor by the exhaust method and by means of various acid-binding agents with or without neutral salts, such as sodium chloride or sodium sulfate, dyeings having very good color yields which are improved compared with the individual dyes. They are preferably applied from an aqueous bath at temperatures between 40 and 105° C., if desired at temperatures up to 130° C. under superatmospheric pressure, and if desired in the presence of customary dyeing auxiliaries. One possible procedure is to introduce the material into the warm bath and to gradually heat the bath to the desired dyeing temperature and to complete the dyeing process at that temperature. The neutral salts which speed up the exhaustion of the dyes can if desired not be added to the bath until after the actual dyeing temperature has been reached.

The padding process likewise produces excellent color yields and a very good color build-up on cellulose fibers, on which fixing can be effected by batching at room temperature or elevated temperature, for example at up to about 60° C., by steaming or with dry heat in a conventional manner.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print paste and subsequent fixation either by passing the printed material through a hot electrolyte-comprising alkaline bath or by overpadding with an alkaline electrolyte-comprising padding liquor with subsequent batching of this treated material or subsequent steaming or subsequent treatment with dry heat, produce strong prints with well-defined contours and a clear white ground. The appearance of the prints is not greatly affected by variations in the fixing conditions.

When fixing by means of dry heat in accordance with the customary thermofix processes, hot air from 120 to 200° C. is used. In addition to the customary steam at 101 to 103° C. it is also possible to use superheated steam and high-pressure steam at temperatures of up to 160° C.

The acid-binding agents which effect the fixation of the dyes of the dye mixtures of the invention on the cellulose fibers include for example water-soluble basic salts of the alkali metals and likewise alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium formate, sodium dihydrogenphosphate, disodium hydrogen-phosphate, sodium trichloroacetate, waterglass or trisodium phosphate.

The dye mixtures of the invention are notable for a high yield of fixation when applied to the cellulose fiber materials by dyeing or printing. The cellulose dyeings obtained following the customary aftertreatment by rinsing to remove unfixed dye portions exhibit excellent wetfastnesses, in particular since such unfixed dye portions are easily washed off on account of their good solubility in cold water.

The dyeings and prints obtainable with the dye mixtures of the invention have bright hues; especially the dyeings and prints on cellulose fiber materials have good lightfastness and very good wetfastnesses, such as wash, milling, water, seawater, crossdyeing and acidic and also alkaline perspiration fastness properties, also good fastness to pleating, hotpressing and rubbing.

Furthermore, the dye mixtures of the invention can also be used for the fiber-reactive dyeing of wool. Moreover, wool which has been given a nonfelting or low-felting finish (cf. for example H. Rath, Lehrbuch der Textilchemie, Springer-Verlag, 3rd Edition (1972), p. 295–299, especially the finish by the so-called Hercosett process (p. 298); J. Soc. Dyers and Colourists 1972, 93–99, and 1975, 33–44) can be dyed with very good fastness properties.

The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzenesulfonic acid and/or of an aminonaphthalenesulfonic acid or on the basis of a reaction product of for example stearylamine with ethylene oxide. For instance, the dye mixture of the invention is preferably subjected to the exhaustion process initially from an acidic dyebath having a pH of about 3.5 to 5.5 under pH control and the pH is then, toward the end of the dyeing time, shifted into the neutral and perhaps weakly alkaline range up to a pH of 8.5 to bring about, especially for very deep dyeings, the full reactive bond between the dyes of the dye mixtures of the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dye mixtures of the invention is very good, they can also be used with advantage in customary continuous dyeing processes. The color strength of the dye mixtures of the invention is very high.

The dye mixtures of the invention produce bright, yellowish to bluish red dyeings on the materials mentioned, preferably fiber materials.

The examples hereinbelow serve to illustrate the invention. Parts and percentages are by weight, unless otherwise stated. Parts by weight relate to parts by volume as the kilogram relates to the liter. The compounds described in the examples in terms of a formula are indicated in the form of the free acids; in general, they are prepared and isolated in the form of their salts, preferably sodium or potassium salts, and used for dyeing in the form of their salts. The starting compounds mentioned in the form of the free acid in the following examples, especially table examples, can similarly be used in the synthesis as such or in the form of their salts, preferably alkali metal salts, such as sodium or potassium salts.

EXAMPLE 1 a) A suspension of 319.2 parts of 1-amino-8-naphthol-3,6-disulfonic acid in 1000 parts of water and 300 parts of ice is admixed with 190.1 parts of cyanuric chloride by thorough stirring. The reaction batch is subsequently stirred for four hours between 0 and 15° C. and at a pH between 1.7 and 2.2 (maintained by means of sodium bicarbonate).

b) The solution of the dichlorotriazine compound obtained according to a) is combined with a pH 5.5–6.0 solution of 281.0 parts of 4-(β-sulfatoethylsulfonyl)aniline in 640 parts of water. The pH is maintained at about 5 and the reaction mixture is warmed to 30–45° C. in the course of one to two hours.

c) A pH 6.7–6.8 solution of 140.5 parts of 4-(β-sulfatoethylsulfonyl)aniline and 151.5 parts of 2-naphthylamine-1,5-disulfonic acid in 500 parts of water are admixed with 171 parts of a 40% strength aqueous sodium nitrite solution. This mixture is added with thorough stirring to a mixture of 800 parts of comminuted ice and 160 parts of 31% strength aqueous hydrochloric acid. Stirring is continued at between 0° C. and 5° C. for one more hour, and then, as usual, excess nitrous acid is destroyed with a little amidosulfonic acid.

c) The secondary condensation product prepared according to b) is combined with the diazonium salt solution prepared according to c). To effect the coupling reaction, the strongly acidic reaction mixture is adjusted to pH 4.5–6.5 with sodium bicarbonate at about 15° C. and warmed to 20–25° C. It is subsequently stirred at that pH and temperature for some hours longer until the coupling has ended.

d) The batch is then adjusted to a pH between 6.0 and 6.5 by means of sodium carbonate and clarified, and the filtrate is spray-dried.

This gives about 1650 parts of an electrolyte salt (predominantly sodium chloride and sodium sulfate) powder comprising about 40% of the sodium salt of the compound of the formula (1a)

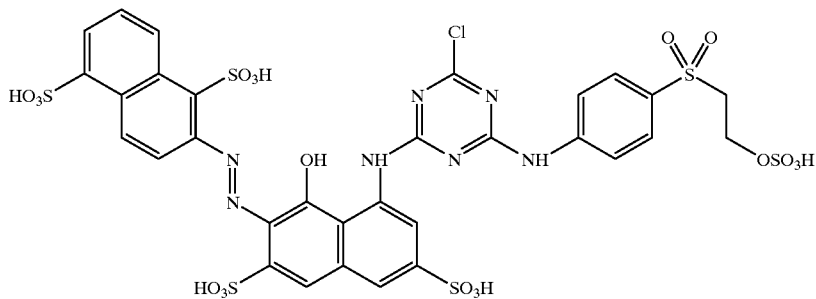

(1a)

and about 40% of the sodium salt of the compound of the formula (2a)

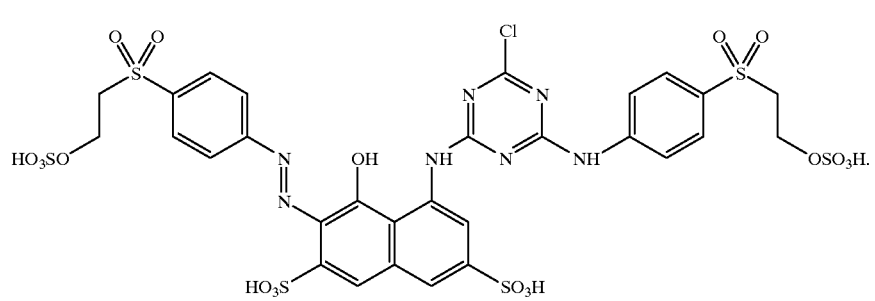

(2a)

This mixture exhibits very good dye properties and, when applied to the materials mentioned in the description part, such as cellulose fiber materials, especially cotton and viscose, by the application and fixing methods customary in the art for fiber-reactive dyes, provides strong red dyeings and prints having very good fastness properties, especially very good wash-, light-, alkali-, acid-, water-, seawater-, perspiration- and rubfastnesses. The dyeings are also notable for their high degree of fixation and good build-up on the cellulose materials.

EXAMPLE 2

A mixture of 330 parts of water and 140 parts of ice is rapidly mixed with 47.5 parts of cyanuric chloride and 79.8 parts of 1-amino-8-naphthol-3,6-disulfonic acid by thorough stirring, the batch is subsequently stirred for about 3.5 hours at a pH between 1.5 and 2.0 and a temperature between 10 and 15° C., and the solution of this primary condensation product is clarified by means of diatomaceous earth and filtration.

The pH is then adjusted to 5 with calcium carbonate, and 70.3 parts of 3-(β-sulfatoethylsulfonyl)aniline are added, the batch is stirred at 18 to 22° C. for two to three hours, then heated to 50 to 55° C. and maintained at that temperature for 30 minutes while the pH is kept constant at 4.0 to 4.5 by means of calcium carbonate. Stirring is subsequently continued at 18 to 20° C. for some hours.

The solution is combined with a conventionally (diazotization by means of sodium nitrite and sulfuric acid in an aqueous medium) prepared suspension of the diazonium salt of 35 parts of 3-(β-sulfatoethylsulfonyl)aniline and 38 parts of 2-naphthylamine-1,5-disulfonic acid, the strongly acidic coupling mixture is then adjusted to pH 4.0–6.5 by means of calcium carbonate at about 10° C. and is subsequently stirred at 10 to 14° C. and within this pH range for some hours longer. The calcium sulfate is filtered off with suction, and washed with water, and the calcium ions in this combined filtrate and wash liquor are precipitated by means of sodium oxalate at a pH of 4.5 to 5.0 and a temperature of 30° C. After stirring for one hour, the batch is filtered, and the dye mixture of the invention is isolated from the filtrate by spray drying.

This gives about 280 parts of a dark red powder which, as well as electrolyte salts, comprises about 44% of the sodium salt of the compound of the formula (1b)

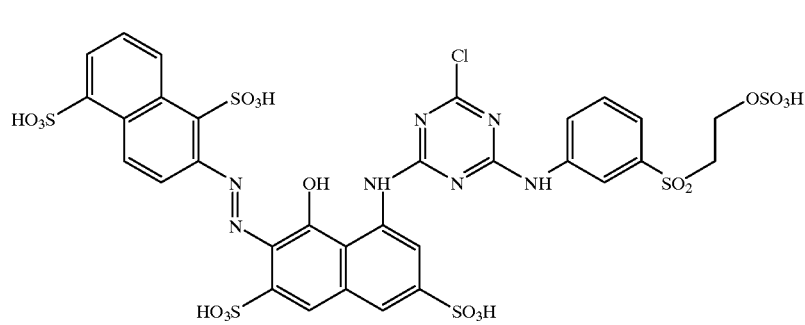

and about 40% of the sodium salt of the compound of the formula (2b)

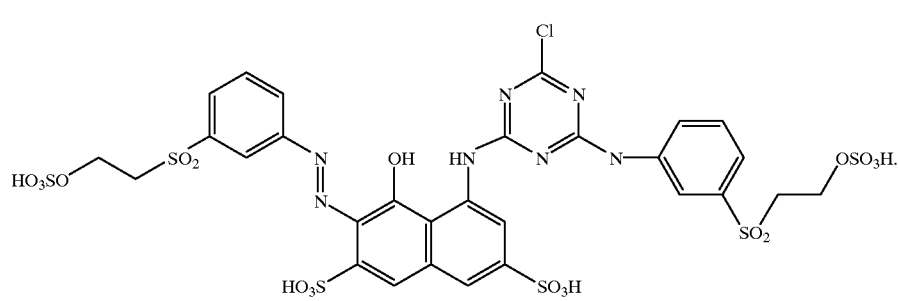

This dye mixture of the invention has very good application properties and, applied by the printing and dyeing methods customary in the art for fiber-reactive dyes, produces on cellulose fiber materials, for example, strong red dyes and prints having very good manufacturing and performance fastnesses, of which the lightfastness, the wash-, perspiration-, water- and seawaterfastnesses and also the stability to chlorinated tap water may be mentioned in particular. The fixation rate on cellulose fiber materials of this dye mixture of the invention is very high.

EXAMPLES 3 to 46

The table examples which follow describe further inventive mixtures of dyes of the general formulae (1) and (2). They are preparable in a manner according to the invention either by mechanically mixing the individual dyes or else chemically, for example similarly to one of the above operative examples, from the starting components (cyanuric chloride or cyanuric fluoride, 1-amino-8-naphthol-3,6-disulfonic acid, amino compounds of the formulae 3B and 3C as second condensation components and amino compounds of the formulae 3D and 3E as diazo components and optionally with an amine of the general formula $HNR^3R^4$ or alcohol of the general formula $HOR^3$).

The dye mixtures of the invention have very good application properties and provide on the materials mentioned in the description part, especially cellulose fiber materials, when applied by the dyeing and printing application methods customary in the art, preferably by the application and fixing methods customary in the art of fiber-reactive dyes, strong dyeings and prints having good fastness properties and a good color build-up in the hue reported in the respective table example.

The numerical ratios reported in the MR column specify the weight ratio in percent of the dye or dyes of the general formula (1) to the dye or dyes of the general formula (2) in which the dyes are present in the respective dye mixture.

| | Dye of the general formula 1 | | | | | Dye of the general formula 2 | | | | |
| --- | --- | --- | --- | --- | --- | --- | --- | --- | --- | --- |
| Example | $R^1$ | $X^1$ | p | Position of sulfonic acid groups | $R^2$ | $R^1$ | $X^2$ | $Y^1=Y^2$ | MR | Hue |
| 3 | H | Cl | 2 | 1,5 | H | H | Cl | $CH_2CH_2OSO_3$ | 90:10 | red |
| 4 | H | Cl | 2 | 1,5 | H | H | Cl | $CH_2CH_2OSO_3$ | 80:20 | red |
| 5 | H | Cl | 2 | 1,5 | H | H | Cl | $CH_2CH_2OSO_3$ | 70:30 | red |
| 6 | H | Cl | 2 | 1,5 | H | H | Cl | $CH_2CH_2OSO_3$ | 60:40 | red |
| 7 | H | Cl | 2 | 1,5 | H | H | Cl | $CH_2CH_2OSO_3$ | 55:45 | red |
| 8 | H | Cl | 2 | 1,5 | H | H | Cl | $CH_2CH_2OSO_3$ | 50:50 | red |
| 9 | H | Cl | 2 | 1,5 | H | H | Cl | $CH_2CH_2OSO_3$ | 45:55 | red |
| 10 | H | Cl | 2 | 1,5 | H | H | Cl | $CH_2CH_2OSO_3$ | 40:60 | bluish red |
| 11 | H | Cl | 2 | 1,5 | H | H | Cl | $CH_2CH_2OSO_3$ | 30:70 | bluish red |
| 12 | H | Cl | 2 | 1,5 | H | H | Cl | $CH_2CH_2OSO_3$ | 20:80 | bluish red |
| 13 | H | Cl | 2 | 1,5 | H | H | Cl | $CH_2CH_2OSO_3$ | 10:90 | bluish red |
| 14 | H | Cl | 2 | 1,5 | H | H | Cl | $CH_2CH_2OSO_3$ | 45:55 | red |
| 15 | H | Cl | 2 | 1,5 | H | H | Cl | $CH_2CH_2OSO_3$ | 50:50 | red |
| 16 | H | Cl | 2 | 1,5 | H | H | Cl | $CH_2CH_2OSO_3$ | 45:55 | red |
| 17 | H | Cl | 2 | 1,5 | H | H | Cl | $CH_2CH_2OSO_3$ | 60:40 | red |
| 18 | H | F | 1 | 1 | H | H | Cl | $CH_2CH_2OSO_3$ | 40:60 | bluish red |
| 19 | H | Cl | 1 | 1 | H | H | Cl | $CH=CH_2$ | 60:40 | red |
| 20 | H | Cl | 1 | 1 | H | H | Cl | $CH=CH_2$ | 55:45 | red |
| 21 | H | Cl | 1 | 1 | H | H | Cl | $CH=CH_2$ | 50:50 | red |
| 22 | H | Cl | 1 | 4 | H | H | Cl | $CH=CH_2$ | 45:55 | red |
| 23 | H | Cl | 1 | 4 | H | H | Cl | $CH=CH_2$ | 40:60 | bluish red |
| 24 | H | F | 1 | 4 | H | H | F | $CH=CH_2$ | 60:40 | red |
| 25 | H | F | 1 | 4 | H | H | F | $CH=CH_2$ | 55:45 | red |
| 26 | H | F | 1 | 5 | H | H | F | $CH=CH_2$ | 50:50 | red |
| 27 | H | F | 1 | 5 | H | H | F | $CH=CH_2$ | 45:55 | red |
| 28 | H | F | 1 | 5 | H | H | F | $CH=CH_2$ | 40:60 | red |
| 29 | H | F | 1 | 5 | H | H | Cl | $CH_2CH_2OSO_3$ | 45:55 | red |
| 30 | H | Fl | 2 | 5,7 | H | H | Cl | $CH_2CH_2OSO_3$ | 50:50 | red |
| 31 | H | F | 2 | 5,7 | H | H | Cl | $CH_2CH_2OSO_3$ | 45:55 | red |
| 32 | H | F | 2 | 5,7 | H | H | Cl | $CH_2CH_2OSO_3$ | 60:40 | red |
| 33 | $SO_3H$ | Cl | 2 | 1,5 | $SO_3H$ | H | Cl | $CH_2CH_2OSO_3$ | 70:30 | red |
| 34 | $SO_3H$ | Cl | 2 | 1,5 | $SO_3H$ | H | Cl | $CH_2CH_2OSO_3$ | 60:40 | red |
| 35 | OMe | Cl | 2 | 1,5 | $SO_2H$ | H | Cl | $CH_2CH_2OSO_3$ | 45:55 | red |
| 36 | OMe | Cl | 1 | 1 | $SO_3H$ | H | Cl | $CH_2CH_2OSO_3$ | 50:50 | red |
| 37 | OMe | Cl | 1 | 4 | $SO_3H$ | H | Cl | $CH_2CH_2OSO_3$ | 55:45 | red |
| 38 | OMe | Cl | 1 | 4 | $SO_3H$ | H | Cl | $CH_2CH_2OSO_3$ | 40:60 | bluish red |
| 39 | OMe | Cl | 1 | 4 | $SO_3H$ | H | Cl | $CH_2CH_2OSO_3$ | 70:30 | red |
| 40 | OMe | Cl | 1 | 4 | $SO_3H$ | H | Cl | $CH_2CH_2OSO_3$ | 40:60 | bluish red |
| 41 | H | OMe | 2 | 1,5 | H | H | OMe | $CH_2CH_2OSO_3$ | 70:30 | bluish red |
| 42 | H | OMe | 2 | 1,5 | H | H | OMe | $CH_2CH_2OSO_3$ | 80:20 | bluish red |
| 43 | H | NHCN | 2 | 1,5 | H | H | NHCN | $CH_2CH_2OSO_3$ | 90:10 | bluish red |
| 44 | $SO_3H$ | NHCN | 1 | 5 | $SO_3H$ | H | NHCN | $CH_2CH_2OSO_3$ | 45:55 | red |
| 45 | H | Morph | 2 | 1,5 | H | H | Morph | $CH_2CH_2OSO_3$ | 50:50 | red |
| 46 | $SO_3H$ | Morph | 2 | 5,7 | $SO_3H$ | H | Morph | $CH_2CH_2OSO_3$ | 45:55 | red |

What is claimed is:

1. Dye mixtures comprising one or more azo dyes of the general formula (1) and one or more azo dyes of the general formula (2)

(1)

(2)

where
p is 1 or 2,
$R^1$, $R^{1'}$ and $R^2$ are independently hydrogen or a group of the general formula $SO_3M$ or $OCH_3$,
$R^5$ and $R^6$ are independently hydrogen or $C_1$–$C_4$ alkyl,
$X^1$ and $X^2$ are independently fluorine or chlorine or a grouping of the general formula $NR^3R^4$ or $OR^3$,
$R^3$ is hydrogen, $C_1$–$C_4$ alkyl or optionally substituted aryl,
$R^4$ has one of the meanings of $R^3$ or is aryl or alkyl (which may be substituted by $SO_2Y$, $SO_3M$ or $OCH_3$), optionally substituted morpholino or pyrimidino or NHCN,
Y, $Y^1$ and $Y^2$ are independently vinyl or a grouping of the general formula $CH_2CH_2Z$,
Z is a grouping which can be eliminated by the action of alkali, and
M is a hydrogen atom, an ammonium ion or the equivalent of an alkali or alkaline earth metal.

2. Dye mixtures as claimed in claim 1, wherein the mixing ratio of the azo dye of the general formula 1 to the azo dye of the general formula 2 is within the range from 90:10% by weight to 10:90% by weight.

3. Dye mixtures as claimed in claim 1, wherein the mixing ratio of the azo dye of the general formula 1 to the azo dye of the general formula 2 is within the range from 70:30% by weight to 30:70% by weight.

4. Dye mixtures as claimed in claim 1, wherein the mixing ratio of the azo dye of the general formula 1 to the azo dye of the general formula 2 is within the range from 55:45% by weight to 45:55% by weight.

5. Dye mixtures as claimed in claim 1, wherein
p is 2, and the two-$SO_3M$ groups are in positions 1 and 5,
$R^1$, $R^{1'}$, $R^2$, $R^5$, and $R^6$ are each hydrogen,
$X^1$ and $X^2$ are each chlorine or fluorine,
Y, $Y^1$ and $Y^2$ are each —$C_2H_4OSO_3M$, and
M is hydrogen, lithium or sodium.

6. A process for preparing the dye mixture as claimed in claim 1, which comprises mechanically mixing requisite amounts of the azo dyes of the general formulae 1 and 2 in solid or liquid form.

7. A process for preparing a dye mixture as claimed in claim 1, which comprises reacting a compound of the general formula (3A)

(3A)

where M is as defined in claim 1, with a trihalotriazine and subsequently reacting the resulting product with a mixture of one or more amino compounds of the general formula (3B) and one or more amino compounds of the general formula (3C)

(3B)

(3C)

where $R^1$, $R^{1'}$, $R^5$, $R^6$, Y and $Y^2$ are each as defined in claim 1 and then reacting the resulting diaminohalotriazine compounds with a diazonium salt mixture prepared from an amine of the general formula (3D)

(3D)

and a naphthylamine of the general formula (3E)

(3E)

where $R^2$, $Y^1$, M and p are each as defined in claim 1, to form the mixture of the azo dyes 1 and 2 and, optionally reacting the resulting mixture with compounds $HOR^3$ or $HNR^3R^4$, where $R^3$ and $R^4$ are each as defined in claim 1.

8. The dye mixture as claimed in claim 4, wherein
p is 2, and the two-$SO_3M$ groups are in positions 1 and 5,
$R^1$, $R^{1'}$, $R^2$, $R^5$, and $R^6$ are each hydrogen,
$X^1$ and $X^2$ are each chlorine or fluorine,
Y, $Y^1$ and $Y^2$ are each —$C_2H_4OSO_3M$, and
M is hydrogen, lithium or sodium.

9. A process for dyeing or printing hydroxyl-and/or carboxamido-containing material which comprises applying dye mixture the dye mixture as claimed in claim 1 in dissolved form to the material and fixing the dye mixture on the material by (a) means of heat, (b) with the aid of an alkaline agent (c) by means of heat and with the aid of an alkaline agent.

10. The process as claimed in claim 9, wherein the material is a fiber material.

11. The dye mixture as claimed in claim 2, wherein p is 2, and the two-$SO_3M$ groups are in positions 1 and 5, $R^1$, $R^{1'}$, $R^2$, $R^5$, and $R^6$ are each hydrogen, $X^1$ and $X^2$ are each chlorine or fluorine, Y, $Y^1$ and $Y^2$ are each —$C_2H_4OSO_3M$, and M is hydrogen, lithium or sodium.

12. The dye mixture as claimed in claim 3, wherein p is 2, and the two-$SO_3M$ groups are in positions 1 and 5, $R^1$, $R^{1'}$, $R^2$, $R^5$, and $R^6$ are each hydrogen, $X^1$ and $X^2$ are each chlorine or fluorine, Y, $Y^1$ and $Y^2$ are each —$C_2H_4OSO_3M$, and M is hydrogen, lithium or sodium.

* * * * *